(12) United States Patent
Gray

(10) Patent No.: US 9,572,017 B2
(45) Date of Patent: Feb. 14, 2017

(54) METHOD AND SYSTEM FOR REMOTE CONTROLLING MOBILE PHONES

(75) Inventor: Tobias Edward Sebastian Gray, Cambridge (GB)

(73) Assignee: RealVNC Ltd, Cambridge, Cambridgeshire (GB)

( * ) Notice: Subject to any disclaimer, the term of this patent is extended or adjusted under 35 U.S.C. 154(b) by 522 days.

(21) Appl. No.: 14/117,488

(22) PCT Filed: May 24, 2012

(86) PCT No.: PCT/GB2012/051172
§ 371 (c)(1),
(2), (4) Date: May 13, 2014

(87) PCT Pub. No.: WO2012/160384
PCT Pub. Date: Nov. 29, 2012

(65) Prior Publication Data
US 2015/0126174 A1   May 7, 2015

Related U.S. Application Data

(60) Provisional application No. 61/497,298, filed on Jun. 15, 2011.

(30) Foreign Application Priority Data

May 26, 2011   (GB) .................................. 1108840.8

(51) Int. Cl.
*H04W 8/22*   (2009.01)
*G06F 9/50*   (2006.01)
(Continued)

(52) U.S. Cl.
CPC .............. *H04W 8/22* (2013.01); *G06F 3/1454* (2013.01); *G06F 9/4445* (2013.01);
(Continued)

(58) Field of Classification Search
CPC ....... H04W 8/22; G06F 9/5038; G06F 9/4445; G06F 3/1454; G06F 9/4881; H04M 1/72527; G09G 5/395
See application file for complete search history.

(56) References Cited

U.S. PATENT DOCUMENTS 6,757,897 B1   6/2004   Shi et al.
7,747,702 B2   6/2010   Anderson et al.
(Continued)

FOREIGN PATENT DOCUMENTS

EP   1859601   11/2007
JP   H07253893 A   10/1995
(Continued)

OTHER PUBLICATIONS

International Application No. PCT/GB2012/051172, International Search Report and Written Opinion mailed Aug. 28, 2012.
(Continued)

*Primary Examiner* — George Eng
*Assistant Examiner* — Joseph Dean, Jr.
(74) *Attorney, Agent, or Firm* — Sheppard, Mullin, Richter & Hampton LLP

(57) ABSTRACT

A mobile device comprising a processor which is configured to run at least one of a plurality of threads, said plurality of threads comprising a mobile control thread, a priority adjusting thread and at least one other thread; a scheduler for scheduling threads to be run on said processor dependent on a priority of an thread relative to other threads, a display for displaying data to a user, an input system for a user to input commands, and a communication link for connecting said mobile device to a remote terminal, wherein, when said mobile control thread is running the processor is configured to capture data currently displayed on said display; send said captured data over said communication link; and issue an (Continued)

update sent notification to activate said priority adjusting thread; wherein, when said priority adjusting thread is running, the processor is configured to determine, on receipt of an update sent notification, whether a previous update sent notification issued less than a threshold time earlier, determine whether said mobile control thread has used more than a threshold amount of said processor, and if both determining steps are met reduce said priority of said mobile control thread below a priority of said at least one other thread and set a timer whereby when said timer expires, said priority of said mobile control thread is increased above said priority of said at least one other thread.

20 Claims, 13 Drawing Sheets

(51) Int. Cl.
| | |
|---|---|
| *G06F 9/44* | (2006.01) |
| *G06F 3/14* | (2006.01) |
| *H04M 1/725* | (2006.01) |
| *G06F 9/48* | (2006.01) |
| *G09G 5/395* | (2006.01) |

(52) U.S. Cl.
CPC .......... *G06F 9/4881* (2013.01); *G06F 9/5038* (2013.01); *H04M 1/72527* (2013.01); *G09G 5/395* (2013.01)

(56) References Cited

U.S. PATENT DOCUMENTS

| | | | |
|---|---|---|---|
| 9,317,329 B2* | 4/2016 | Tejaswini | G06F 9/5011 |
| 2003/0046324 A1 | 3/2003 | Suzuki et al. | |
| 2005/0080897 A1* | 4/2005 | Braun | H04L 41/0803 709/225 |
| 2006/0037025 A1* | 2/2006 | Janssen | G06F 9/4881 718/107 |
| 2010/0107175 A1 | 4/2010 | Abe et al. | |
| 2010/0299436 A1 | 11/2010 | Khalid et al. | |
| 2011/0276699 A1* | 11/2011 | Pedersen | H04L 45/24 709/227 |

FOREIGN PATENT DOCUMENTS

| | | |
|---|---|---|
| JP | 2003067201 A | 3/2003 |
| JP | 2008276666 A | 11/2008 |
| JP | 2009130708 A | 6/2009 |
| WO | 2008114525 A1 | 9/2008 |

OTHER PUBLICATIONS

GB Patent Application No. 1108840.8, Search Report mailed Sep. 21, 2011.
Tanaka, Michiru et al., "Proposal and Implementation of an Interactive Presentation Streaming System Enabling Immediate Playback of Recorded Media," Multimedia Distributed, Cooperative and Mobile Symposium (DICOMO), Jul. 2004.
Japanese Patent Application No. 2014-511956, Office Action mailed Mar. 1, 2016.

* cited by examiner

METHOD AND SYSTEM FOR REMOTE CONTROLLING MOBILE PHONES

CROSS-REFERENCE TO RELATED APPLICATIONS

This application is a national stage application pursuant to 35 U.S.C. §371 of International Application No. PCT/GB2012/051172 filed May 24, 2012, which claims priority to U.S. Provisional Patent Application Ser. No. 61/497,298 filed Jun. 15, 2011 and GB Patent Application No. 1108840.8 filed May 26, 2011. The disclosures of the above-referenced applications are hereby incorporated by reference herein.

FIELD OF THE INVENTION

The present invention relates to a method and system for remote controlling mobile phones or similar small portable devices.

BACKGROUND

It is known to use a remote computer terminal to view and control mobile phones. One such configuration is shown in FIG. 1a. The contents of the display of the mobile device 10 are duplicated on the remote computer terminal 12. The remote computer terminal has an interface mechanism which allows the user to send user input events, such as pressing a physical key on the device or touching a touch screen input, to the mobile device being controlled. As will be appreciated, the form of data link and the nature of the remote computer terminal can vary, depending on the situation being used.

The remote computer terminal may be for a support engineer using the remote control facility to provide device support to a customer using a mobile phone. If a customer of a company experiences a problem with a mobile phone, such as being unable to send picture messages, the support engineer can diagnose and fix the problem by interacting with the phone by using the remote terminal. Alternatively, the support engineer may use the remote terminal to install or update software or other settings on a user's mobile phone. In this situation the data link would typically be via a form of radio communication, such as Wifi, GPRS or HSDPA and the remote terminal may be a long distance, e.g. hundreds of miles away from the mobile phone.

Alternatively, the remote terminal may be located close to the mobile phone for example in the automotive industry. The remote terminal may be embedded as a large display mounted on the dashboard of the car. The familiar interface of the user's phone is shown on the display and the user can use this interface to play music or perform map based navigation. Typically, there will be additional safety mechanisms to prevent the user from using the remote terminal to control distracting applications, such as computer games, while driving. In this situation the data link would typically be via a physically wired connection, such as USB, or a short range radio communication system, such as Wifi or Bluetooth.

FIG. 1b is a block diagram showing the internal components of the mobile phone 10 and connected remote terminal 12 and their interactions. Activity on a phone may be divided into 'threads', where a thread may be defined as the smallest unit of processing that can be scheduled by an operating system. Typically, only one thread is running at a time. The mobile phone 10 comprises an operating system having a display system 20, an input system 22 and a data link system 26, all of which are connected to a VNC (Virtual Networking Computing) server thread 24. Other threads, e.g. other applications (not shown), may be installed on the phone. Similarly, the remote terminal comprises an operating system having a display system 30, a control system 32 and a data link system 36, all of which are connected to a VNC (Virtual Networking Computing) viewing thread 34. The data link systems of the mobile phone and remote terminal are connected as described above.

The behaviour of the VNC Server Thread is shown in FIG. 2. The VNC server thread waits to receive an input event or a display changed notification. If an input event is detected, the input event is sent to the operating system of the remote terminal. If a display changed notification is received, the mobile phone display is captured, then encoded into VNC format and sent over the connection between the data link systems of the mobile phone and remote terminal.

For historical reasons, threads don't declare how much CPU (processor) time they want. Instead each thread declares:

Whether it wants the CPU at any given moment
Its priority, relative to other threads The phone operating system then, effectively, chooses the thread with the highest priority which wants the CPU. (Multi-core phones might choose several.) Most threads on the phone declare themselves as a particular priority. For example, an application which wants to download e-mail in the background might declare itself low priority, whilst a 3D game might declare itself the highest possible priority. Most normal applications would be somewhere in-between.

Historically remote terminal connections to phones have used radio data links based on technologies such as GPRS or HSDPA for communication between mobile phone and remote terminal. The theoretical data rate of GPRS is about 10 kb/s (although in actual use only about 5 kb/s is seen) and HSDPA data connections is about 1 Mb/s (although in actual use only about 100 kb/s is seen). Using data links with these rates acts as a bottleneck, limiting the number of updates per second and therefore reducing how much time the VNC main thread uses the CPU of the device for.

However using faster data links, such as USB2 with 60 MB/s data rates (although only about 2 Mb/s is seen in actual use) prevents the data link from being the bottleneck. A faster data rate means that the VNC main thread can send updates considerably more frequently. If there is no mechanism for limiting the CPU time used by the VNC main thread then it is possible for it to use all of the CPU time sending updates, slowing down other applications on the phone by many times. For example on a Nokia 5800 Xpress music device the time taken to load a video can go from 6 seconds to over a minute if no mechanism is used to limit the VNC main thread's processing time.

The present applicant has recognised that an improved method and system for remote controlling mobile phones is required.

SUMMARY OF THE INVENTION

According to a first aspect of the invention, there is provided a mobile device comprising a processor which is configured to run at least one of a plurality of threads, said plurality of threads comprising a mobile control thread, a priority adjusting thread and at least one other thread; a scheduler for scheduling threads to be run on said processor dependent on a priority of an thread relative to other threads, a display for displaying data to a user, an input system for a user to input commands, and a communication link for connecting said mobile device to a remote terminal, wherein, when said mobile control thread is running the processor is configured to capture data currently displayed on said display; send said captured data over said communication link; and issue, once said captured data has been sent, an update sent notification to activate said priority adjusting thread; wherein, when said priority adjusting thread is running, the processor is configured to determine, on receipt of an update sent notification, whether a previous update sent notification issued less than a threshold time earlier, and if said determining step is met reduce said priority of said mobile control thread relative to a priority of said at least one other thread and set a timer whereby when said timer expires, said priority of said mobile control thread is increased relative to said priority of said at least one other thread.

Thus, the mobile device waits until a complete update has been sent before determining whether or not to make any priority changes. If said determining step is not met, no changes to the priority of the mobile control thread are made. The mobile control thread thus iteratively repeats it steps, i.e. the capturing, sending and issuing steps. Said priority adjusting thread is no longer active but ready, waiting to run when next activated. The increase in priority of the mobile control thread at the expiry of the timer is preferably under the control of the priority adjusting thread. Accordingly, the priority adjusting thread may be activated on receipt of either notification of expiry of the timer and/or on receipt of an update sent notification. After activation, the priority adjusting thread runs only for a short time and thus does not adversely affect the performance of the mobile phone.

The priority adjusting thread's function is to adjust the priority of the mobile control thread between a higher level and a lower level, with these higher and lower levels being relative to other threads running on the device. Said priority adjusting thread may change said priority of said mobile control thread between a high priority and a normal priority level. Alternatively, said priority adjusting thread changes said priority of said mobile control thread between a normal priority and a low priority level. When the priority of the mobile control thread is increased above the priority of the at least one other thread (i.e. increased to a high level), the processor will run the mobile control thread in preference to the at least one other thread. By contrast, when the priority of the mobile control thread is reduced below that of the at least one other thread (i.e. reduced to a low level), the mobile control thread will only run when the other thread is not running. When the priority of the mobile control thread is approximately the same as the other thread (i.e. set at a normal level), the scheduler will select one or other thread dependent on its rules. If there are a plurality of other threads, the priority adjusting thread may adjust the priority of the mobile control thread between the highest and lowest priority of all the other threads. Alternatively, the priority adjusting thread may increase the priority of the mobile control thread to above some but not all threads to prioritise other threads. Said priority adjusting thread preferably has a fixed priority which is higher than all other threads to ensure its operation when trigger signals are received. The priority adjust thread may therefore lead to an improvement in the performance of the device because task scheduling within the operating system is improved.

By contrast, VNC servers typically use a fixed priority for the VNC server thread. However, the present applicant has recognised that a fixed priority is not appropriate. If the priority is fixed high and there is high bandwidth (e.g. with the automotive application described above), the VNC server would want to send updates continuously to the viewer. The VNC server would thus declare itself as continuously wanting to use the CPU, and lower-priority tasks—like normal applications—would never run. By contrast, if the priority is fixed low, other high priority threads, e.g. a 3D game, would want to continuously draw to the screen, thus continuously using the CPU. Accordingly, the VNC server thread may never have a chance to send that screen image to the viewer. Thus the invention described herein improves the performance of the embedded CPU by varying the priority dependent on the CPU resources used by different applications. The mobile device is then able to adapt to cater for any applications running on the mobile device.

These constraints are particularly serious on mobile devices, because—unlike on a PC—applications may never relinquish the CPU whilst they're waiting for a slow, mechanical hard disk to provide some information. This does not occur on mobile devices due to the typically slower CPU clock rate that they have (and therefore less operations in a period of time) and the absence of slow mechanical disks. It's therefore more common to see a single high-priority thread continuously use the CPU without a break.

Systems with more hardware constraints than mobile phones will usually be running a Real Time Operating Systems (RTOS) and have little or no ability to add additional software once the device has been created. Being unable to add additional software allows for cooperative multitasking between threads when handling scheduling, therefore eliminating the need to do dynamic priority adjusting. It is also usual to use deadline scheduling techniques in RTOSs, instead of the priority based scheduling operating systems that this invention covers.

Thus, the interaction between the mobile control thread and the priority adjusting thread is balancing two competing objectives, namely:
  a) Sending out screen updates frequently so that a viewer of said screen updates on a remote terminal gets a responsive view of the phone screen.
  b) Not using so much phone CPU that it adversely affects the performance of other application software (i.e. the at least one other thread) on the phone.

The invention makes use of the adaptive nature of the VNC protocol. If a slower data rate is used, multiple display updates may be merged into a single update on the remote terminal. Historically this has been to support slower data links. However, in the present invention, multiple display updates may occur but not be actioned by the mobile control thread while its priority is lowered. Consequently, this adaptability is being used to reduce the CPU time used by the VNC main thread on the CPU of the mobile phone being remote controlled.

As explained above, remote control of phones may, for example, be used by network operators, helpdesks and in cars. To do this, a mobile control viewer thread or "VNC viewer" is preferably installed at the helpdesk/car, and a mobile control thread or "VNC server" is preferably installed on the mobile device.

Thus according to another aspect of the invention, there is provided a system for controlling a mobile device comprising a mobile device as described above, a remote terminal and a data link connecting said remote terminal and said mobile device; wherein said remote terminal comprises a display for displaying data to a user, an input system for a user to input commands, and a processor configured to receive said captured data from said mobile device and display said data on said remote terminal display whereby data from said mobile device display is duplicated on said remote terminal display.

The following optional features apply to all the aspects described above.

The following threshold values may be used to provide a reasonable rate of updates (between 1 and 5 frames per second) while minimising the impact of running the remote control:

Threshold time—700 ms
Threshold amount of said processor—50%
Timer period—350 ms Said capturing data step may be responsive to receiving a display change notification from said display. In other words, the mobile control thread may be activated by a display change notification issued by said display. Whether or not the mobile control thread runs following activation depends on the priority of the mobile control thread relative to other threads and whether or not these other threads are running.

Said capturing data step may also comprise an encoding step for encoding the captured data in an appropriate form for sending over the data link.

Said processor may be further configured to determine whether said mobile control thread has used more than a threshold amount of said processor. Said second determining step may be done simultaneously with said first determining step. Only if both determining steps are met, will the processor reduce said priority of said mobile control thread below a priority of said at least one other thread and set a timer whereby when said timer expires, said priority of said mobile control thread is increased above said priority of said at least one other thread. Both said determining steps may take place while the mobile control thread is running on the mobile device. There are many ways of determining the processor usage and this may be determined by the mobile control thread itself or by another thread.

Consideration of the processor usage by the mobile control thread is advantageous because it eliminates some of the guess work in deciding by how much the mobile control thread is slowing the device down. The determining may comprise determining whether or not the mobile control thread has used the processor for longer than any other threads. In other words, the determining comprises using the elapsed (wall clock) time. This is useful in situations where loads are fairly evenly balanced between the mobile control thread and the other threads in the system. However, this method is less useful with low speed data links and highly stressed systems.

The determining may comprise determining how long each of the different steps in the mobile control thread has used the processor and may then determine whether the capturing step, particularly the encoding step has run for longer than any other threads.

For example, the processor may determine that the mobile control thread has taken all the threshold time (e.g. 700 ms) to perform an update. With low speed data links, it is likely that the mobile control thread was only using the processor for a small percentage of that time. The bulk of the time was taken up with transferring the data over the communication link and whilst this is happening the processor is running other threads. In this situation reducing the priority of the mobile control thread will reduce the update frequency without reducing the impact of the mobile control thread on the device (as it was only using a small percentage of the time anyway). Accordingly, in this situation, it is not advisable to reduce the priority of the mobile control thread.

Taking 700 ms to perform an update could also occur in the situation where the mobile control thread is taking 500 ms of CPU time to encode the data to send over the data link. In this situation, it is advisable to throttle back the mobile control thread. Otherwise the other thread(s) running in the system, which are the ones doing 'useful' work, will only be getting 30% of the CPU time, so take 3 times longer to run. How much CPU time encoding takes can vary greatly, depending on what is being encoded.

This applies between devices (a device released today has a considerably faster process than devices released four years ago) and on the same device (a screen which is just the colour black is far easier to encode than a screen with lots of fine detail).

When said mobile control thread is running, the processor may be configured to compare said captured data with data captured previously, and said sending step may be conditional on detecting differences at said comparing step. Thus, unnecessary transmissions of data are avoided.

Said captured data may be encoded into a data format suitable for transmission to the remote terminal. A remote terminal is one which is physically separate from said mobile device and may be located at a distance therefrom. However, the remote terminal may also be located close by the mobile device, e.g. in the in-car arrangement described above.

Said remote terminal processor may be configured to capture input commands, and send said captured input commands over said communication link to said mobile device. Said mobile device processor may then be configured to receive said captured input commands and execute said captured input commands as if they were input on the mobile device input system. Thus, a user is able to control the mobile device from the remote terminal. The mobile control thread may be activated on receipt of an input command from said remote terminal and/or receipt of a display change notification from said mobile phone display.

According to another aspect of the invention, there is provided a method of dynamically adjusting a priority of a mobile control thread which transmits data between a mobile device and a remote terminal, the method comprising capturing data currently displayed on a display of said mobile device; sending said captured data over a communication link between said mobile device and said remote terminal; issuing, once said captured data has been sent, a first update sent notification; repeating said capturing and said sending steps; issuing, once said captured data has been sent, a second update sent notification; determining, on receipt of said second update sent notification, whether said first update sent notification issued less than a threshold time earlier than said second update sent notification, and if said determining step is met reducing said priority of said mobile control thread which performs said capturing, sending and issuing steps from a higher level to a lower level and setting a timer whereby when said timer expires, said priority of said mobile control thread is restored to said higher level.

As with the previous aspects, if said determining step is not met, no change to the priority of the mobile control thread is made. The mobile control thread thus iteratively repeats its steps, i.e. the capturing, sending and issuing steps. Said determining, reducing and setting steps may be controlled by a priority adjusting thread as described above. Accordingly, the optional features described above apply equally to this aspect of the invention.

According to another aspect of the invention, there is provided a mobile device comprising a processor which is configured to run at least one of a plurality of threads, said plurality of threads comprising a mobile control thread, a priority adjusting thread and at least one other thread; a display for displaying data to a user, an input system for a user to input commands, and a communication link for connecting said mobile device to a remote terminal, wherein, when said mobile control thread is running the processor is configured to capture data currently displayed on said display; send said captured data over said communication link; and issue an update sent notification to activate said priority adjusting thread; wherein, when said priority adjusting thread is running, the processor is configured to determine, on receipt of an update sent notification, whether a previous update sent notification issued less than a threshold time earlier, and if said determining step is met reduce said priority of said mobile control thread relative to a priority of said at least one other thread and set a timer whereby when said timer expires, said priority of said mobile control thread is increased relative to said priority of said at least one other thread.

According to another aspect of the invention, there is provided a method of dynamically adjusting a priority of a mobile control thread which transmits data between a mobile device and a remote terminal, the method comprising capturing data currently displayed on a display of said mobile device; sending said captured data over a communication link between said mobile device and said remote terminal; issuing a first update notification; repeating said capturing and said sending steps; issuing a second update notification; determining, on receipt of said second update sent notification, whether said first update notification issued less than a threshold time earlier than said second update notification, and if said determining steps is met reducing said priority of said mobile control thread which performs said capturing, sending and issuing steps from a higher level to a lower level and setting a timer whereby when said timer expires, said priority of said mobile control thread is restored to said higher level.

In these last two aspects, when said mobile control thread is running, the processor may be configured to issue an update sent notification, responsive to said sending step. In other words, said update notification is sent out after the completion of a capture and sending of a display update from the mobile device to the remote terminal. Alternatively, the processor may be configured to issue an update notification, prior to said capturing step; in this case the update notification may be termed an update being sent notification.

The timing of the update sent notification is important as the metric needs to closely approximate what the viewer is seeing on the remote terminal to be useful. If a slow data link is being used between the mobile device and a remote terminal, the time taken to send data over the data link needs to be taken into account. A slow data link will apply some throttling to the update rate because of the time taken to transfer data.

It is also advantageous to use the end of the update because partial updates are not all that helpful to the user. For example, imagine that the mobile device user interface asks the user "Do you want to delete this file?" with a yes and no button at the bottom of the interface. If the device starts to encode the screen with this question on, but then gets throttled halfway through the update, the user will only see the first half of the screen with the question. The user will not know what to do to respond until the rest of the update with 'Yes' and 'No' buttons is sent through.

By waiting until a full update has been sent before considering adjusting the priorities, the user will receive the full screen with question and buttons. In this case, the time spent by the user reading the text and deciding on a course of action can be used as a throttling method, much like the data transfer time being used on a slow data link. Even in the case where the device user interface is animated (e.g. the yes and no buttons have a glowing animation), any adjustment to priorities will only occur after the first update has fully completed. The impact of this to the user will only be that the animation of the buttons is not smooth; the responsiveness and time taken to remotely control the device is not impacted.

The optional features described above also apply.

In each of the above aspects, the other threads which may be configured to run on the mobile device may be a thread which runs continuously, e.g. a game, a thread which runs for a single fixed length of time, e.g. browser download and/or a thread which runs for a plurality of short bursts.

In each of the above aspects, the priority of a mobile control thread is being adjusted. However, it will be appreciated that the invention has more general applicability to ensuring smooth running of a device where processor capability is limited. In this case, the thread may issue an update action notification when it has completed an action.

Thus, according to another aspect of the invention, there is provided a device comprising a processor which is configured to run at least one of a plurality of threads, said plurality of threads comprising a first thread, a priority adjusting thread and at least one other thread; a scheduler for scheduling threads to be run on said processor dependent on a priority of an thread relative to other threads, and a display for displaying data to a user, an input system for a user to input commands, wherein, when said first thread is running the processor is configured to issue, once said first thread has completed an action, an update action notification to activate said priority adjusting thread; wherein, when said priority adjusting thread is running, the processor is configured to determine, on receipt of an update action notification, whether a previous update action notification issued less than a threshold time earlier, and if said determining step is met reduce said priority of said mobile control thread below a priority of said at least one other thread and set a timer whereby when said timer expires, said priority of said mobile control thread is increased above said priority of said at least one other thread.

Similarly, according to another aspect of the invention, there is provided a method of dynamically adjusting a priority of a first thread, the method comprising issuing, once said first thread has completed an action, a first update action notification; issuing, once said first thread has completed a subsequent action, a second update action notification; determining, on receipt of said second update action notification, whether said first update action notification issued less than a threshold time earlier than said second update action notification, and if said determining step is met reducing said priority of said first thread from a higher level to a lower level and setting a timer whereby when said timer expires, said priority of said first thread is restored to said higher level.

BRIEF DESCRIPTION OF THE DRAWINGS

The invention is diagrammatically illustrated, by way of example, in the accompanying drawings, in which.

DETAILED DESCRIPTION OF THE DRAWINGS

Figure 1A:
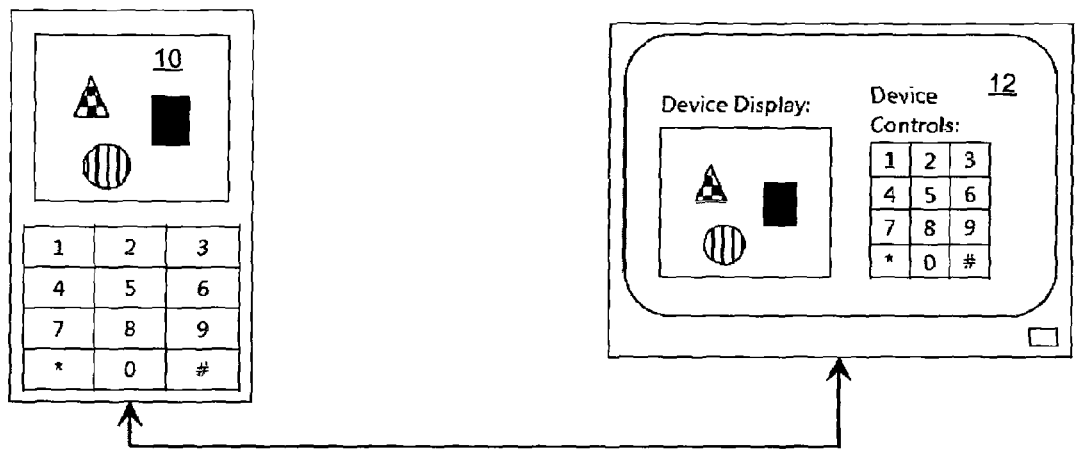
FIGS. 1a and 1b are schematic block diagrams showing a known remote control system.
Figure 1B:
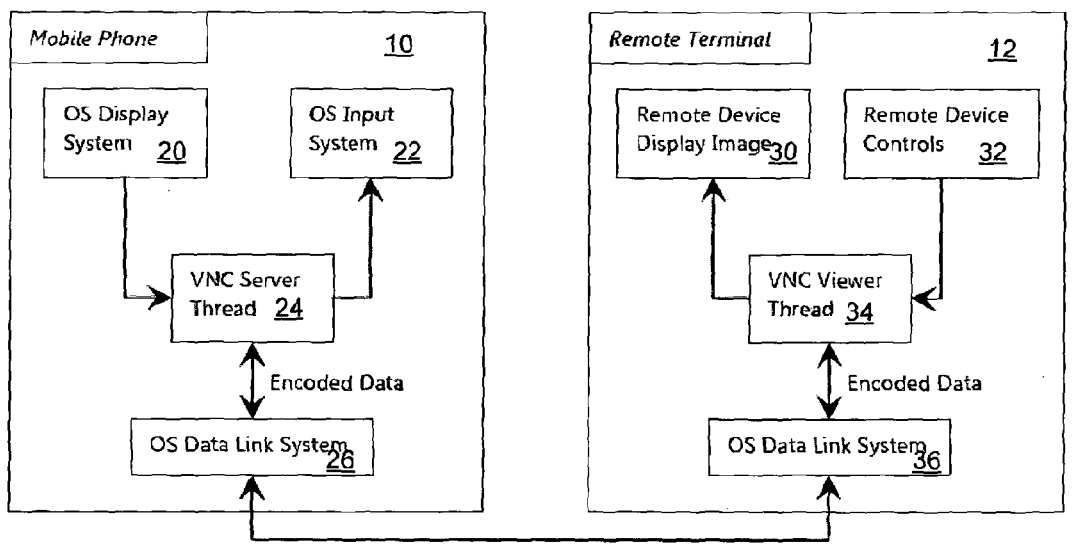

A remote control system according to the present invention is an adaptation of the known system shown in FIGS. 1a and 1 b. As with FIGS. 1a and 1 b, in the present invention, the contents of the display of the mobile device are duplicated on the remote computer terminal. Furthermore, the present invention also comprises the internal components of the known system. Thus, the mobile phone comprises an operating system having a display system, an input system and a data link system, all of which are connected to a VNC server thread (mobile control thread). Similarly, the remote terminal comprises an operating system having a display system, a control system and a data link system, all of which are connected to a VNC viewing thread.

Figure 3:
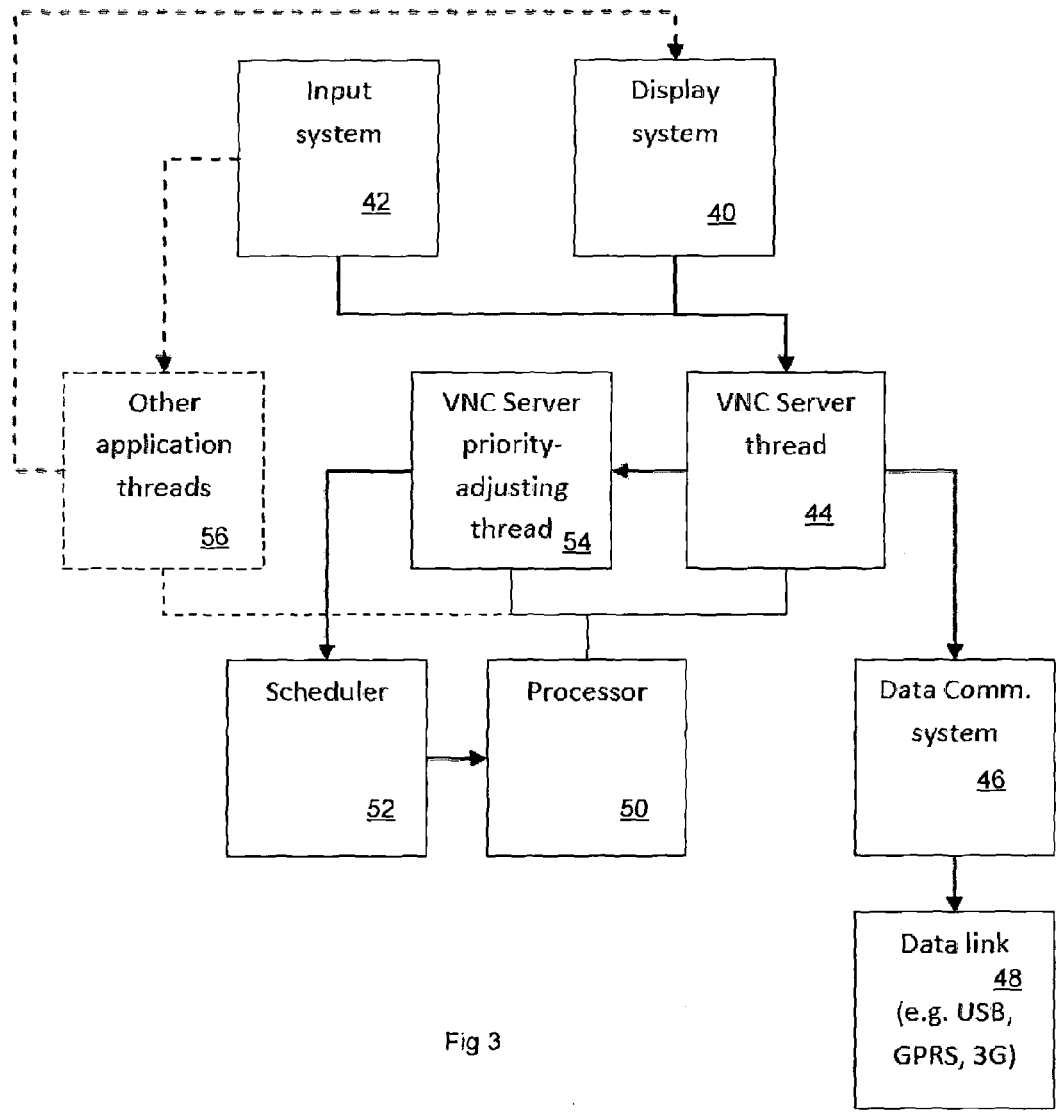
FIG. 3 is a block diagram showing the components involved in a remote control system according an embodiment of the present invention.

FIG. 3 illustrates how the known system is adapted according to the present invention. The components shown in FIG. 3 are preferably housed within the mobile device but it will be appreciated that alternative configurations may also be possible. As above, a display system 40, an input system 42 and a data communication system 46 are connected to a VNC server thread 44. The data communication system 46 is connected to a data link 48 (e.g. USB, GPRS, 3G) to connect to another device. The main adaptation is to include a VNC server priority adjusting thread 54 which is described in more detail below. FIG. 3 also shows the additional components of a processor 50 connected to a scheduler 52. Additional application threads 56 may optionally also be installed on the mobile phone and these optional threads and their interactions with the other components are shown in dashed lines.

Figure 2:
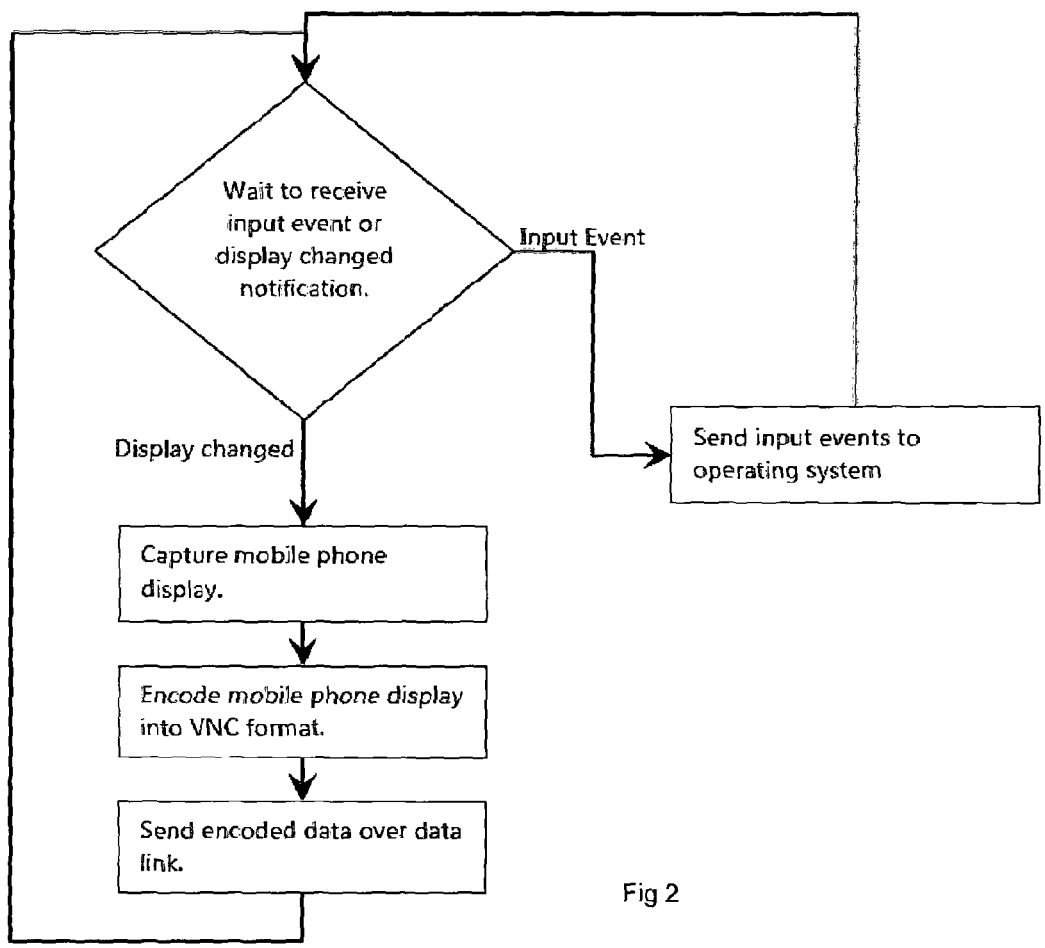
FIG. 2 is a flowchart setting out the method implemented on the system of FIGS. 1a and 1b.
Figure 4A:
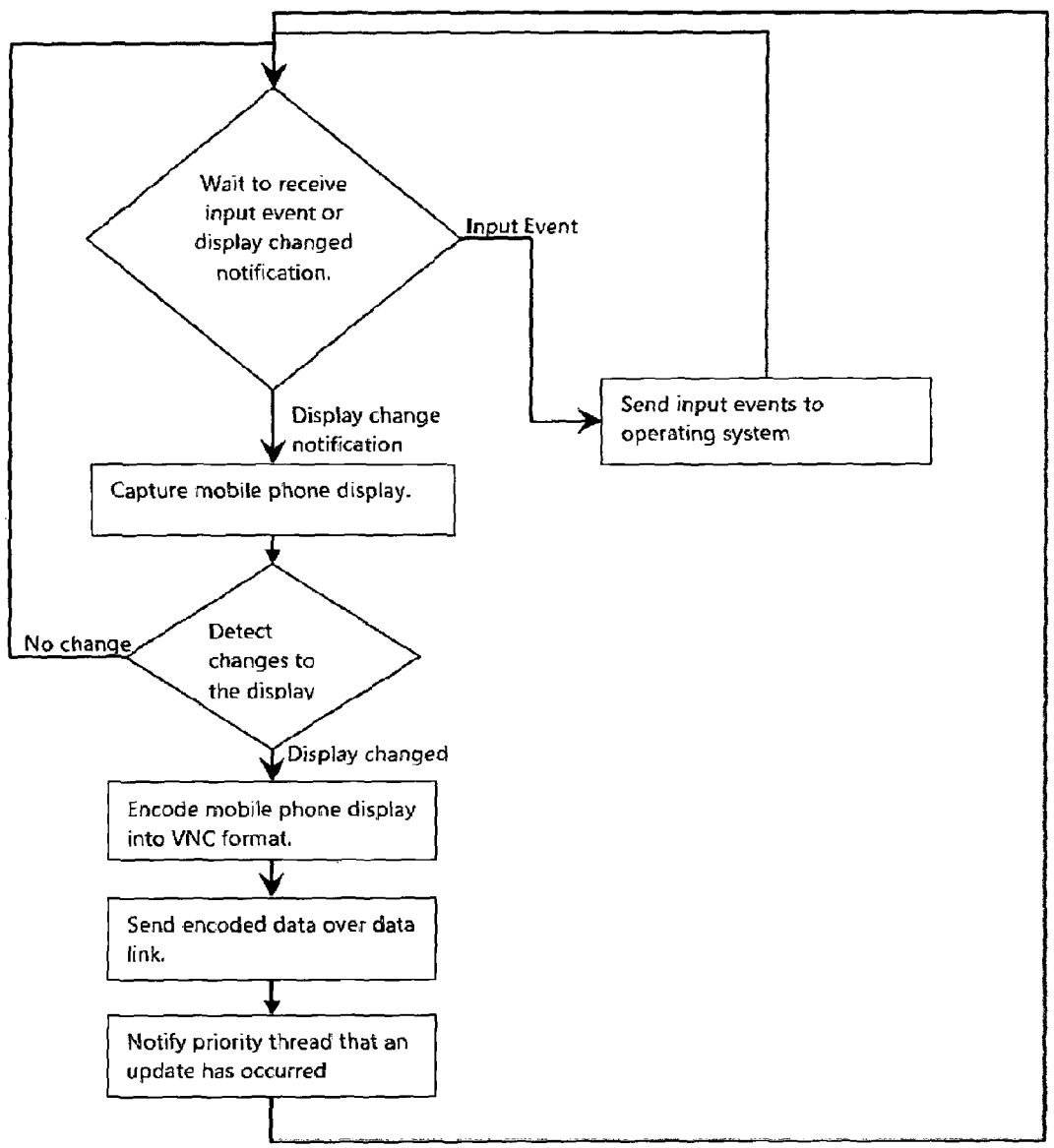
FIGS. 4a and 4b are flowcharts of the steps followed by the VNC server thread and VNC server priority adjusting threads respectively.

FIG. 4a is a flowchart showing the steps carried out by the VNC server thread (mobile control thread) of FIG. 3. This thread does the bulk of the VNC work and has no fixed priority. As with the VNC server thread of FIG. 2, the VNC server thread waits to receive an input event or a display change notification. If an input event is detected, the input event is sent to the operating system of the remote terminal and the thread loops back to waiting. If a display change notification is received, the mobile phone display is captured. However, in contrast to the process shown in FIG. 2, the VNC thread then determines whether or not it can detect any changes in the display. If no changes are detected, the thread loops back to waiting. If a change is detected, the mobile phone display is encoded into VNC format and sent over the connection between the data link systems of the mobile phone and remote terminal. The final step before the process iterates again is for the VNC server thread to notify the VNC server priority adjusting thread that an update has just occurred.

Figure 4B:
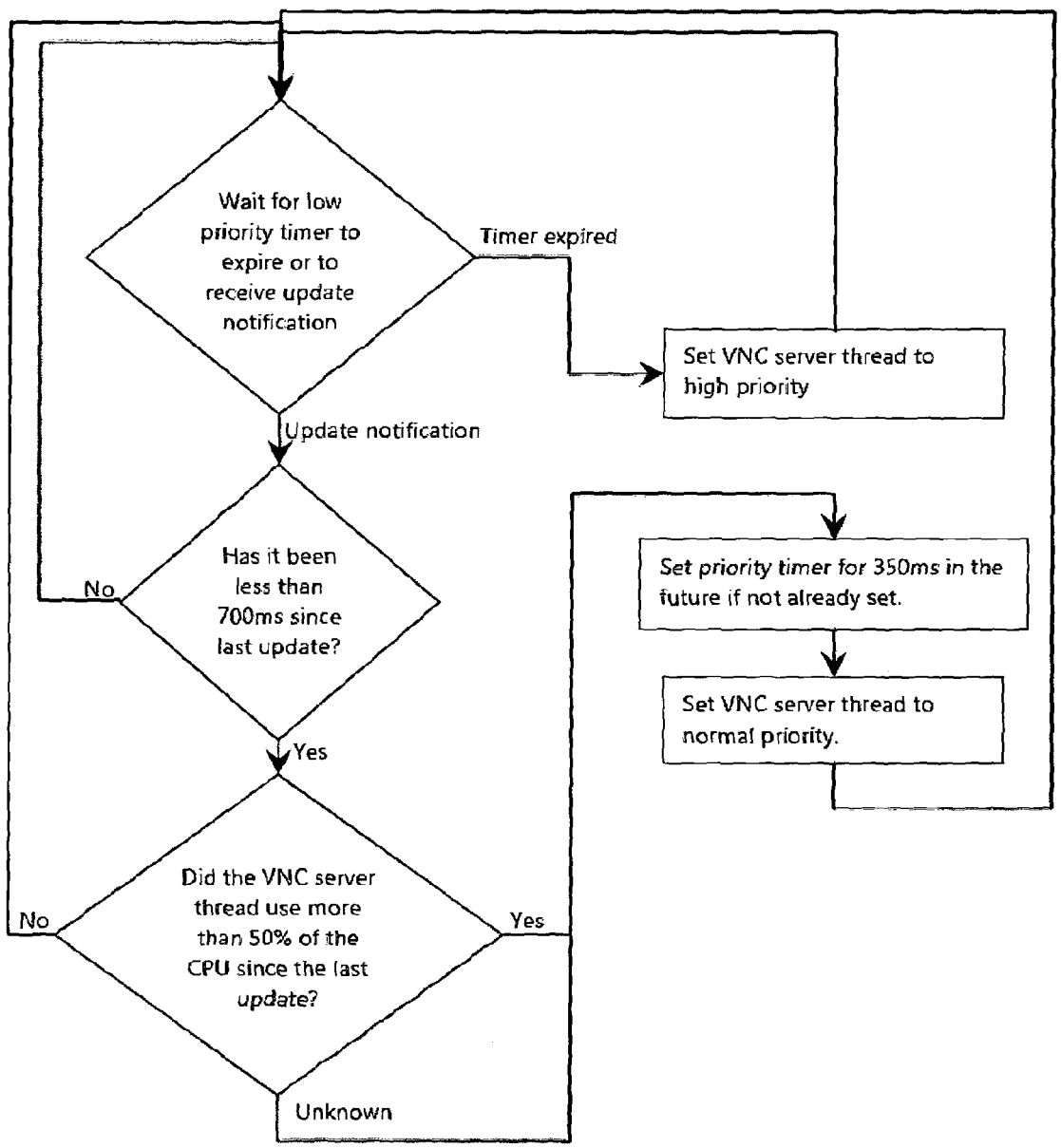

FIG. 4b is a flowchart showing the steps carried out by the VNC server priority adjusting thread of FIG. 3. This thread solely exists to adjust the priority of the VNC server thread. The VNC server priority adjusting thread runs at the highest priority possible, but doesn't perform any operations apart from adjusting the VNC main thread priority. The priority adjusting thread occasionally reduces the priority of the VNC main thread to a normal priority, restoring the original high priority of the VNC main thread after a set period of time. The priority adjusting thread uses the completion of sending of an updated frame (i.e. the final step shown in FIG. 4a) as a trigger to check if the VNC main thread priority should be reduced.

As shown in FIG. 4b, the first decision is for the VNC server priority adjusting thread to determine whether the priority timer has expired or whether an update notification has been received. If the timer has expired, the VNC server priority adjusting thread sets the priority of the VNC server thread to high priority to ensure that it can access the CPU. If an update notification is received, VNC server priority adjusting thread determines when the previous notification was received and whether that previous notification was received less than a predetermined threshold time (e.g. 700 ms) ago. If the time gap between notifications is greater than the predetermined time, the VNC server priority adjusting thread loops back to the first decision step. If the time gap between notifications is less than the fixed time, the VNC server priority adjusting thread determines whether or not the VNC server thread has used more than a predetermined amount (e.g. 50%) of the processor since the previous update.

If the VNC server thread has not used more than the predetermined CPU amount, the VNC server priority adjusting thread loops back to the first decision step. If the VNC server thread has used more than the predetermined CPU amount or the VNC server priority adjusting thread cannot determine how much processing has been used, the VNC server priority adjusting thread sets a priority timer for 350 ms. The VNC server priority adjusting thread also reduces the priority of the VNC server thread, e.g. sets the VNC server thread to normal priority. The VNC server priority adjusting thread then loops back to the first decision step and reiterates the process.

The following threshold values are used to provide a reasonable rate of updates (between 1 and 5 frames per second) while minimising the impact of running the remote control:

Update threshold—700 ms
CPU usage threshold—50%
Low priority period—350 ms

It will be appreciated that these figures are merely illustrative and other values may be contemplated.

Figure 4C:
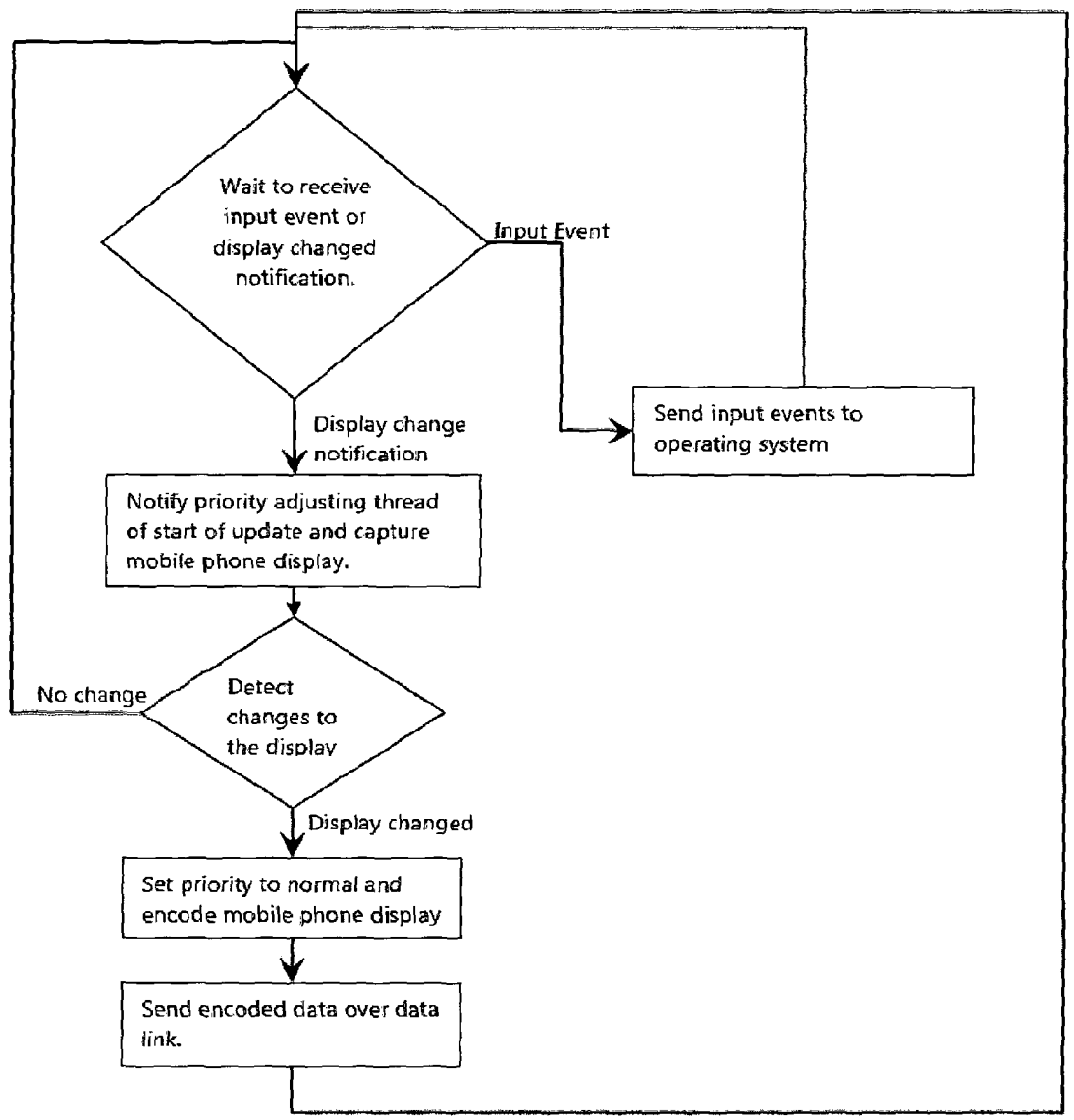
FIGS. 4c and 4d are flowcharts of the steps followed by alternative VNC server thread and VNC server priority adjusting threads respectively.

FIG. 4c is a flowchart showing the steps carried out by an alternative VNC server thread which may be running in FIG. 3. Again, this thread does the bulk of the VNC work and has no fixed priority. As with the VNC server thread of FIG. 4c, the VNC server thread waits to receive an input event or a display change notification. If an input event is detected, the input event is sent to the operating system of the remote terminal and the thread loops back to waiting. However, unlike FIG. 4a, if a display change notification is received, the mobile phone display is captured at the same time as notifying the VNC server priority adjusting thread that an update has started.

The VNC thread then determines whether or not it can detect any changes in the display. If no changes are detected, the thread loops back to waiting. If a change is detected, the mobile phone display is encoded into VNC format at the same time as the priority of the VNC thread is reset to normal. The encoded format is then sent over the connection between the data link systems of the mobile phone and remote terminal. This is the final step before the process iterates.

Figure 4D:
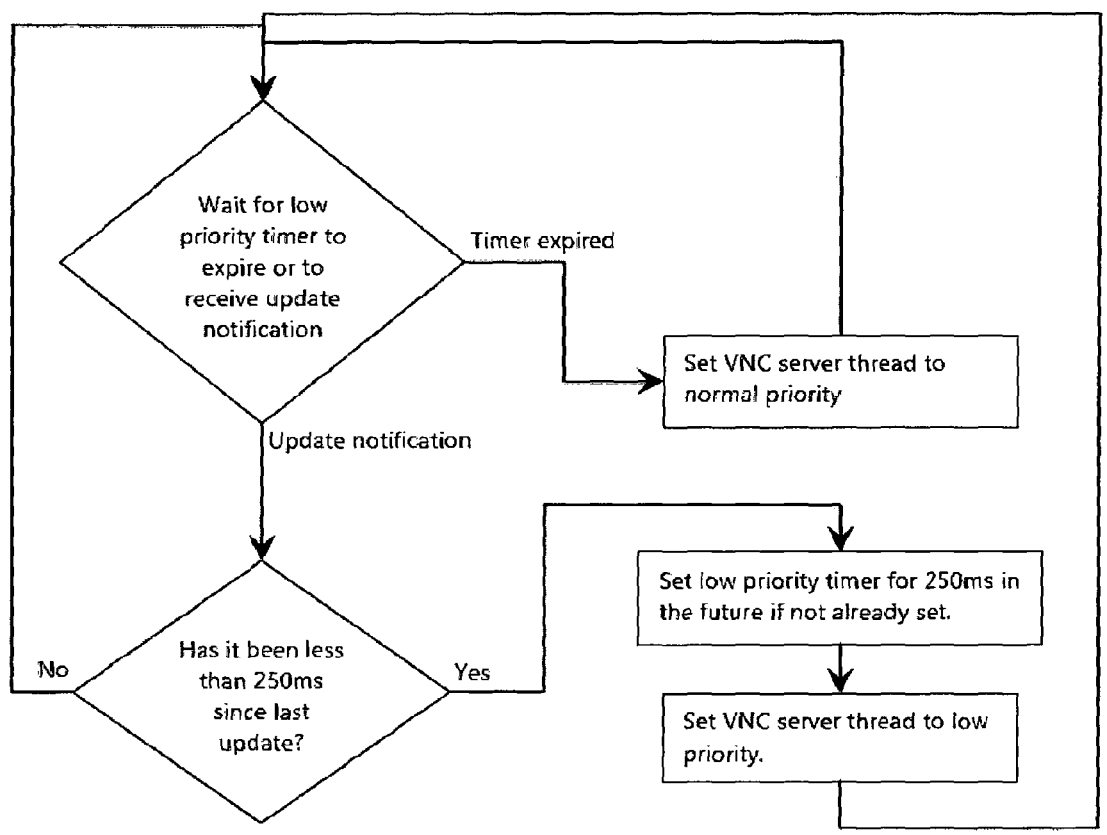

FIG. 4d is a flowchart showing the steps carried out by the alternative VNC server priority adjusting thread which may be implemented in FIG. 3. This thread solely exists to adjust the priority of the VNC server thread. However, in contrast to the thread described in FIG. 4b, the VNC server priority adjusting thread runs at normal priority. As explained in more detail below, the priority adjusting thread reduces the priority of the VNC main thread from normal priority to low priority for a set period (perhaps 250 ms). The priority adjusting thread uses notification of a change to lower priority and notification of finish of the change detection code to restore normal priority. Thus, in contrast to FIGS. 4a and 4b, priority changing is not tied directly to when updates are encoded and sent to the remote terminal. Furthermore, the encoding and sending of an updates always happens at normal priority.

As shown in FIG. 4d, the first decision is for the VNC server priority adjusting thread to determine whether the priority timer has expired or whether an update notification has been received. If the timer has expired, the VNC server priority adjusting thread sets the priority of the VNC server thread to normal priority to ensure that it can access the CPU. If an update notification is received, VNC server priority adjusting thread determines when the previous notification was received and whether that previous notification was received less than a predetermined threshold time (e.g. 250 ms) ago. If the time gap between notifications is greater than the predetermined time, the VNC server priority adjusting thread loops back to the first decision step.

However, in contrast to the arrangement shown in FIG. 4b, if the time gap between notifications is less than the fixed time, the VNC server priority adjusting thread sets the low priority timer for 250 ms in the future if it has not already been set. The VNC server priority adjusting thread also reduces the priority of the VNC server thread, e.g. sets the VNC server thread to low priority. The VNC server priority adjusting thread then loops back to the first decision step and reiterates the process.

Thus, there are notable differences between the two alternatives. For example, in FIGS. 4a and 4b, the VNC server priority adjusting thread is changing the priority of the VNC thread between high and normal priority. However, in FIGS. 4c and 4d, the VNC server priority adjusting thread is changing the priority of the VNC thread between normal and low priority. Furthermore, the threshold value used in the priority timer of FIGS. 4a and 4b is 350 ms whereas the threshold value for FIGS. 4c and 4d is 250 ms.

Figure 5A:
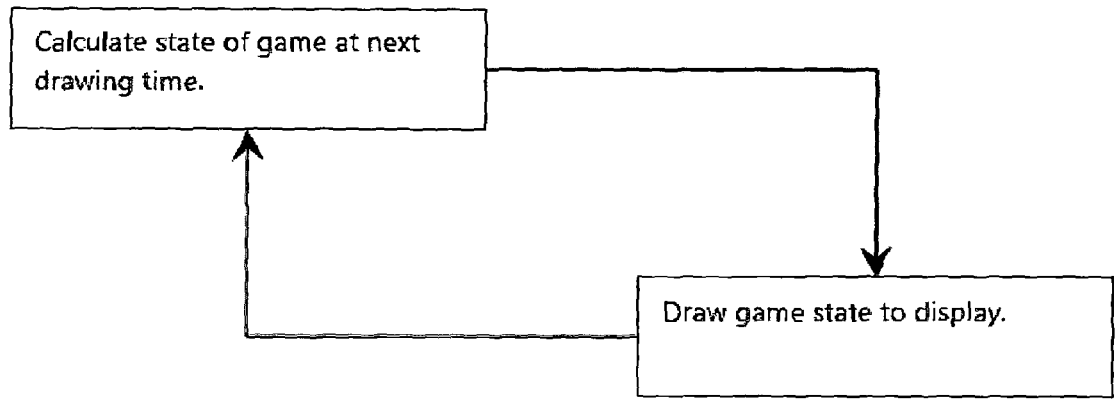
FIGS. 5a to 5d are flowcharts of the method steps used by four different application threads respectively.
Figure 5B:
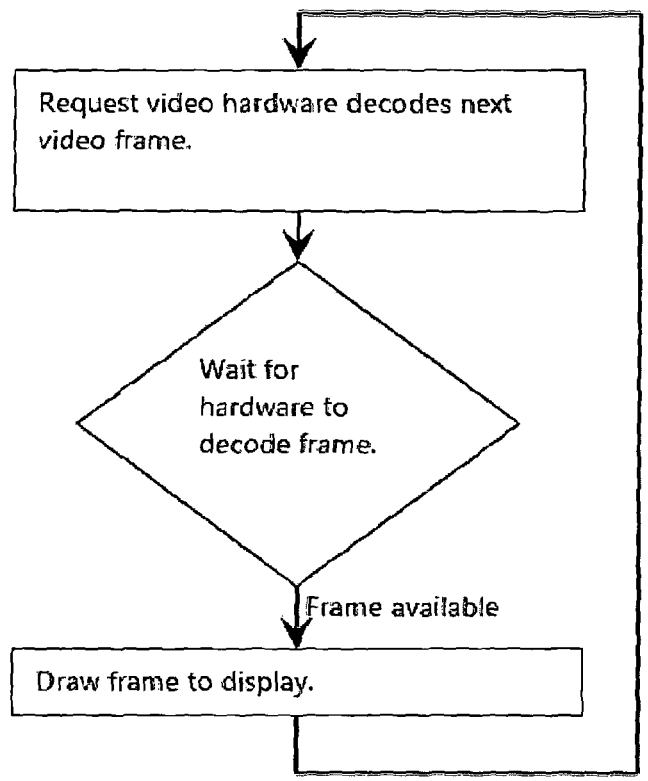

FIGS. 5a to 5d illustrate the behaviour of four different application threads which may be running on the mobile phone, namely:
 1. Constant CPU usage—Game application
 2. Low CPU usage—Hardware accelerated video playback
 3. Fixed CPU usage—Web browser
 4. UI control—Scrolling to next page FIG. 5a illustrates an application which constantly uses the processor of the mobile phone, e.g. a game application. As shown, the game application thread continuously loops between calculating the state of the game at each drawing time and drawing the game state on the display. FIG. 5b illustrates an application thread which does not use the processor a great deal, e.g. hardware accelerated video playback. As shown, the thread loops between first requesting that the hardware decode the next video frame, waiting for the decoding and drawing the decoded frame to the display.

Figure 5C:
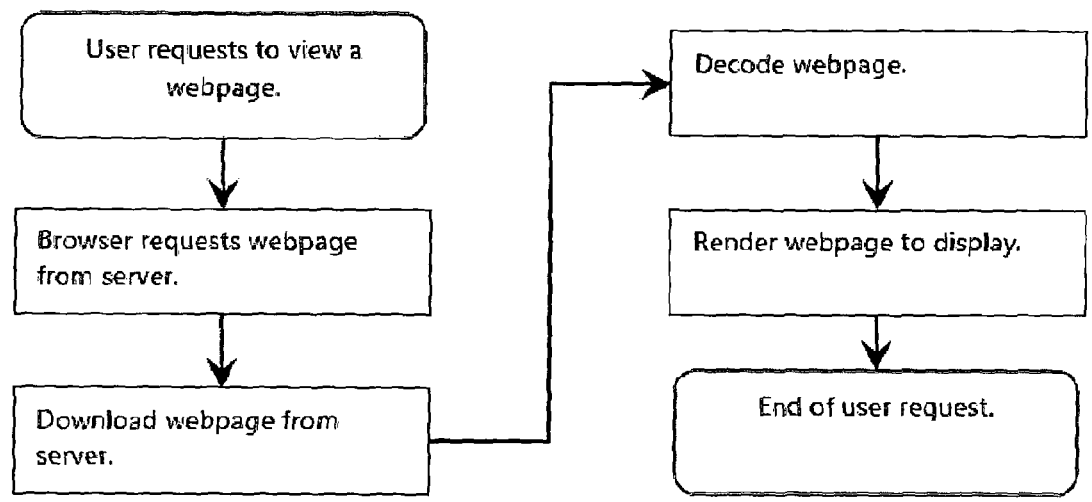
Figure 5D:
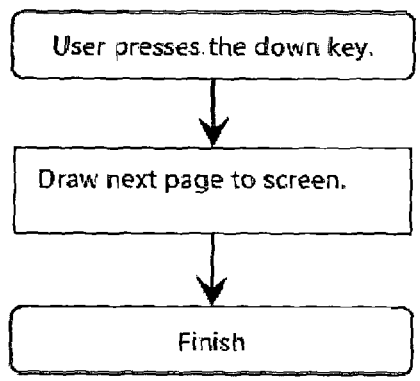

FIG. 5c illustrates an application thread which has fixed use of the processor, e.g. a web browser. In contrast to FIGS. 5a and 5b, there is no continuous loop. As shown, the thread receives a user request to view a webpage, requests the webpage from the server, downloads the webpage, decodes the webpage, renders the webpage to the display and then ends. FIG. 5d illustrates an application thread which controls the user interface, e.g. scrolling to the next page. As with FIG. 5c, there is no continuous loop. First the user presses the down key, the application then draws the next page to the screen and then ends.

FIGS. 6a to 9b illustrate how the above four example threads are affected by the implementation of the VNC server priority-adjusting thread. The goal is to send lots of screen updates to the viewer when nothing else wants to use the CPU, but still to send occasional single updates even when other things are trying to use the whole CPU. As shown in more detail below, the solution works well either with normal applications, which relinquish the CPU, or applications like games which continuously use it.

In each of FIGS. 6a to 9b, a thread shown with dashed lines is ready to run but not running and a thread shown with solid lines and in greyscale ready to run and running. The arrows indicate the notification from the VNC server thread to the VNC server priority-adjusting thread of the update. The character within a circle to the left of each horizontal dotted line indicates the priority represented by that dotted line. The highest priority is represented by an asterisk ('*'), high priority with the letter 'H', normal priority with the letter 'N' and low priority with the letter 'L'. A lightning bolt symbol represents when the VNC main thread detects a change to the display, a star symbol represents when the VNC main thread has completed sending of an update and a chevron to indicate when other threads have changed the display.

Figure 6A:
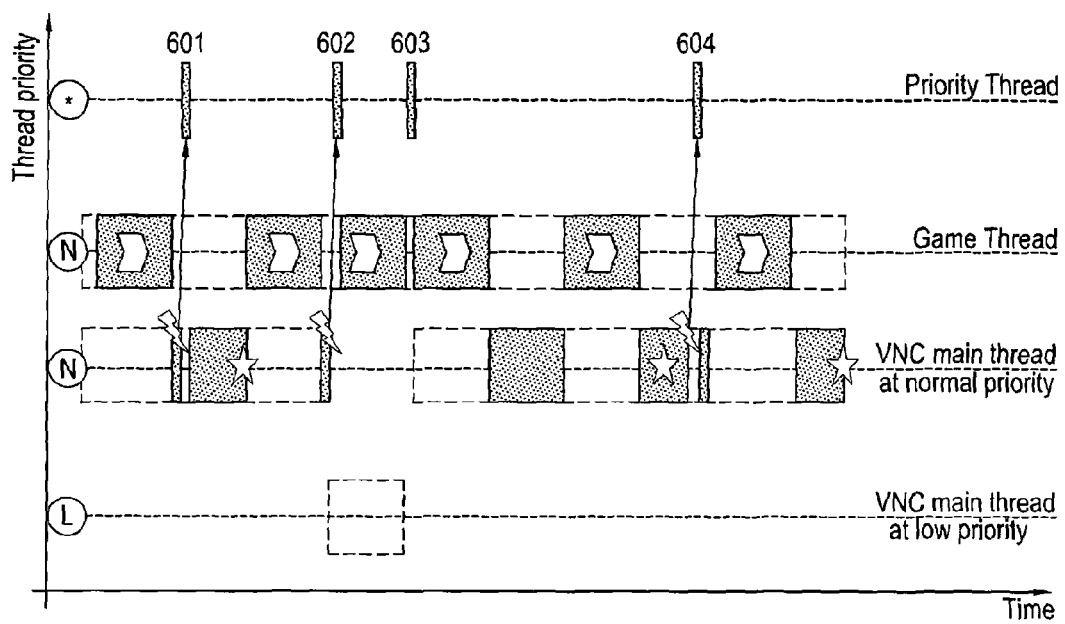
FIGS. 6a and 6b illustrate the changing priority over time for the application thread of FIG. 5a using the system of FIG. 4a or FIG. 4c respectively.
Figure 6B:
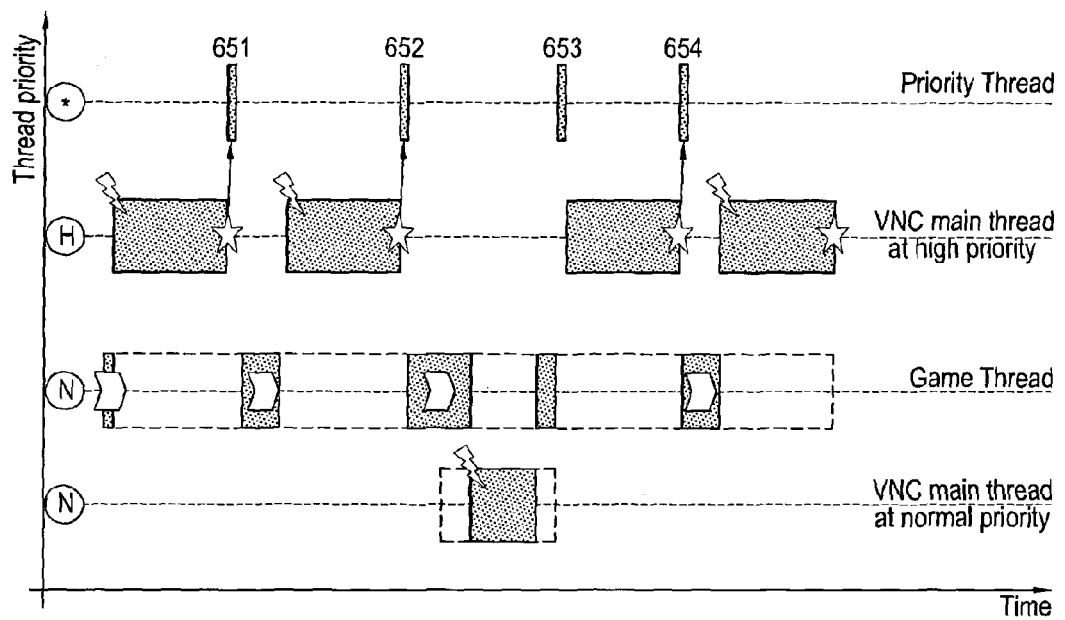

FIGS. 6a and 6b illustrate an example game application which uses the CPU all the time. In FIG. 6a, there are three threads, namely a VNC priority thread having the highest priority, a game thread and a VNC main thread. The steps taken by the VNC threads are described in FIGS. 4c and 4d. Both the game thread and VNC main thread run at a normal priority; the VNC main thread also changes between low and normal priority. For clarity the game thread and VNC main thread running at a normal priority are separated on FIG. 6a, although they are both assigned the same 'normal' priority level. Initially the game thread is running. The VNC main thread receives a display change notification and sends an update notification to the priority thread at the point labelled 601. The priority thread thus runs in response to an update notification received from the main thread that it has begun an update. Since it has been more than 250 ms since the last update, the game thread is interrupted and the VNC main thread captures, encodes and sends the data to the remote terminal. Once these steps are completed as illustrated by the star symbol, the VNC main thread changes to be ready to run, awaiting notification of a display change or an input event and the game thread restarts. It will be appreciated that 250 ms is an illustrative example only; other time periods may be used.

A second update notification is then received by the priority thread so the priority thread runs a second time at the point labelled 602. However, it has been less than 250 ms since the last update. Accordingly, the low priority timer is set for 250 ms in the future and the VNC main thread is set to low priority. Whilst the VNC main thread is at low priority, the game thread runs without interruption regardless of any display change notifications or input events received by the VNC main thread. During this time, the VNC main thread is ready to run but not running. The third time that the priority thread is run, at the point labelled 603, is in response to the low priority timer expiring. The VNC priority thread raises the VNC main thread back to normal priority and the VNC main thread is then ready to run and continue encoding the change noticed at point 602.

Eventually the scheduler will schedule the VNC main thread as it is at the same priority as the game thread and is ready to run. The scheduler then continues to share the CPU time between the game thread and the VNC main thread. After a period of time the VNC main thread has finished encoding the last update as illustrated by the star system. Then it receives a display change notification, as illustrated by the lightning bolt symbol, so an update notification is sent to the priority thread which runs briefly at the point labelled 604. After the display change has been processed by the VNC main thread it returns to waiting and the game thread runs. The process repeats iteratively.

In FIG. 6*b* there are three threads, namely a priority thread having the highest priority, a game thread and a VNC main thread. The steps taken by the VNC threads are described in FIGS. 4*a* and 4*b*. In contrast to the arrangement of FIG. 6*a*, the priority of the VNC main thread is sometimes higher than the game thread. This allows the VNC main thread to update more regularly, while still providing the game thread with a reasonable amount of CPU time. For clarity the game thread and VNC main thread running at a normal priority are separated on FIG. 6*b*, although they are both assigned the same 'normal' priority level.

Initially the game thread is running. This is interrupted by the VNC main thread which is initially at high priority. The VNC main thread may interrupt the game thread in response to receipt of an input event or a display change notification. If the latter, the VNC main thread captures, encodes and sends the data to the remote terminal and then notifies the VNC priority thread that an update has occurred, as shown at point 651. Thus in contrast to FIG. 6*a*, the update notification is sent at the end of the VNC main thread process rather than at the beginning. The game thread then continues until it is interrupted again by the VNC main thread when it receives a display change notification as illustrated by the lightning bolt. The VNC main thread completes an update as illustrated by the star symbol and sends notification to the VNC priority thread, as shown at point 652. The VNC priority thread determines that less than a threshold time (e.g. 750 ms) has elapsed between the two notifications and that the VNC main thread used more than a threshold value (50%) of the CPU between the two update notifications. Accordingly, the VNC priority thread sets the timer to a predetermined value (e.g. 350 ms) and lowers the priority of the main thread to normal.

While the VNC main thread is at normal priority, it is still able to run. However, it runs for less time and the game thread can run. After the time on the timer has elapsed, i.e. 350 ms after the priority of the VNC main thread was adjusted, the VNC priority threads runs again and raises the VNC main thread priority back to high, as shown at point 653. The VNC main thread runs another update and notifies the VNC priority thread and the process begins again.

Figure 7A:
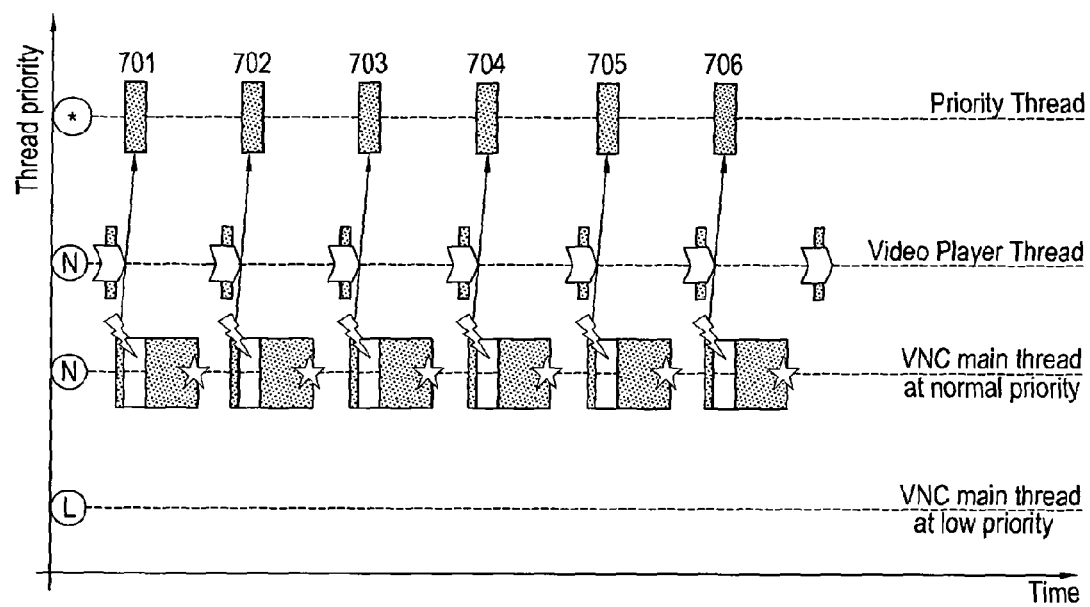
FIGS. 7a and 7b illustrate the changing priority over time for the application thread of FIG. 5b using the system of FIG. 4a or FIG. 4c respectively.
Figure 7B:
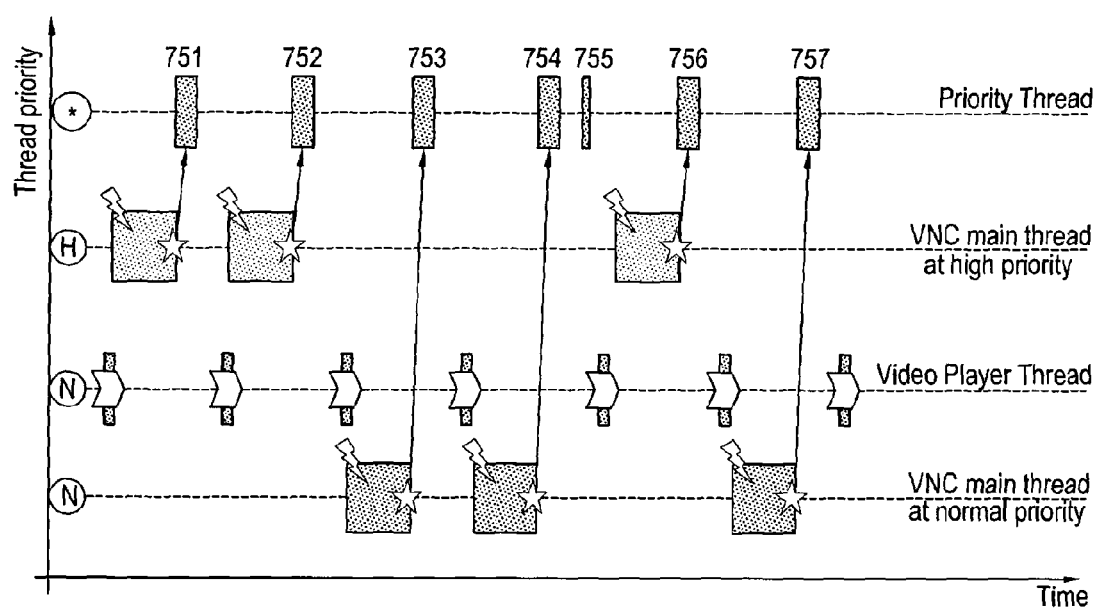

FIGS. 7*a* and 7*b* illustrate an example hardware accelerated video playback which used the CPU for short periods at regular intervals. In FIG. 7*a*, there are three threads, namely a VNC priority thread having the highest priority, a video player thread and a VNC main thread. The steps taken by the VNC threads are described in FIGS. 4*c* and 4*d*. For clarity the video player thread and VNC main thread running at a normal priority are separated on FIG. 7*a*, although they are both assigned the same 'normal' priority level. As shown the video player thread has the same priority as the VNC main thread running at a normal priority. The VNC main thread also changes between low and normal priority. The video player thread runs periodically, each time for a short period. In the gaps between the usage of the CPU by the video player thread, the VNC main thread is predominantly operational. Periodically, the VNC main thread sends an update to the priority thread that it is about to begin an update to the remote terminal, as indicated by points 701 to 706. The priority thread thus runs for a short period and then the VNC main thread continues running until the next burst from the video player thread. These processes repeat iteratively.

In FIG. 7*b* there are three threads, namely a VNC priority thread having the highest priority, a video player thread and a VNC main thread. The steps taken by the VNC threads are described in FIGS. 4*a* and 4*b*. For clarity the video player thread and VNC main thread running at a normal priority are separated on FIG. 7*b*, although they are both assigned the same 'normal' priority level. In contrast to the arrangement of FIG. 7*a*, the priority of the VNC main thread is sometimes higher than the video player thread. As explained in more detail below, there are the same number of updates in both FIGS. 7*a* and 7*b* and thus the processes of FIGS. 4*a* and 4*b* do not reduce the number of updates if there is spare CPU processing time.

The video player thread runs periodically, each time for a short period. In the gaps between the usage of the CPU by the video player thread, the VNC main thread is predominantly operational. In contrast to FIG. 7*a*, the priority of the VNC main thread is changed over time. Initially, the VNC main thread has high priority. The VNC main thread captures, encodes and sends an update of the display to the remote terminal. The VNC main thread then sends an update to the priority thread that it has finished an update to the remote terminal. The priority thread thus runs for a short period at point 751.

After the second burst from the video player thread, the VNC main thread captures, encodes and sends another update of the display to the remote terminal. The VNC main thread then sends an update to the priority thread that it has finished an update to the remote terminal, as indicated by point 752. The VNC priority thread determines that less than a threshold time (e.g. 750 ms) has elapsed between the two notifications and that the VNC main thread used more than a threshold value (50%) of the CPU between the two update notifications. Accordingly, the VNC priority thread sets the timer to a predetermined value (e.g. 350 ms) and lowers the priority of the VNC main thread to normal. Despite the lowered priority, the VNC main thread continues running (to process input events and/or change display notifications) in the gaps between bursts from the video player thread. Updates are sent to the VNC priority thread which runs at points 753 and 754.

Between the fourth and fifth bursts from the video player stream, the time on the timer has elapsed, i.e. 350 ms has passed since the priority of the VNC main thread was adjusted. Accordingly, the VNC priority threads runs again, at point 755, and raises the VNC main thread priority back to high. The VNC main thread then waits for another input, e.g. a display change notification, i.e. waits until after the next burst from the video player thread. The VNC main thread then runs another update and notifies the VNC priority thread at point 756. Once again the VNC priority thread determines that the priority should be reduced. Nevertheless, the VNC main thread runs an update in between bursts of the video player stream and notifies the VNC priority thread at point 757.

Figure 8A:
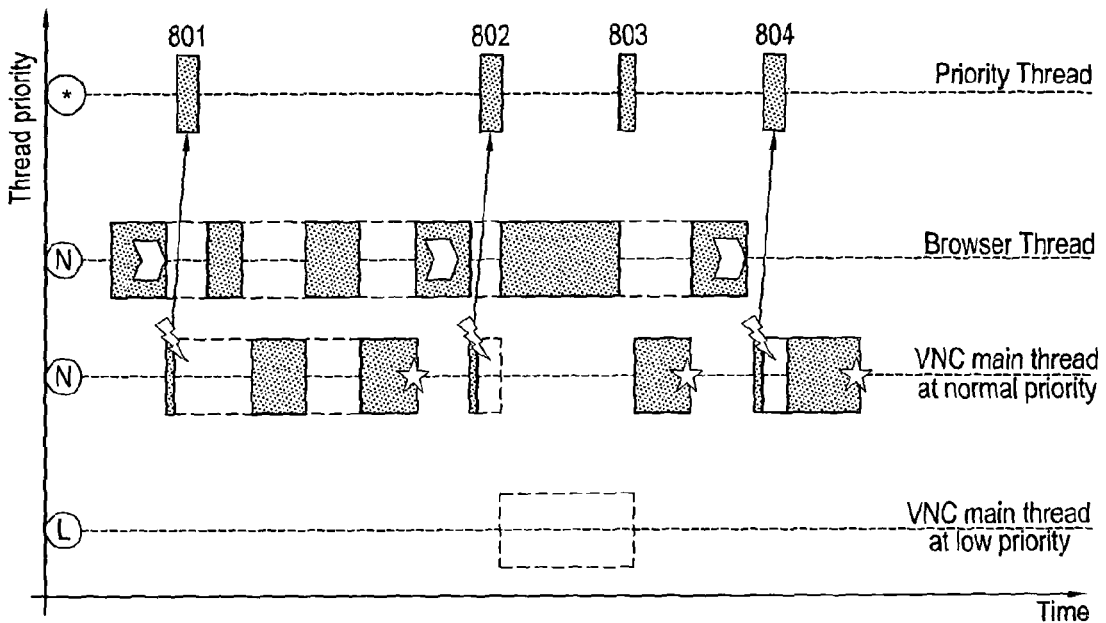
FIGS. 8a and 8b illustrate the changing priority over time for the application thread of FIG. 5c using the system of FIG. 4a or FIG. 4c respectively.
Figure 8B:
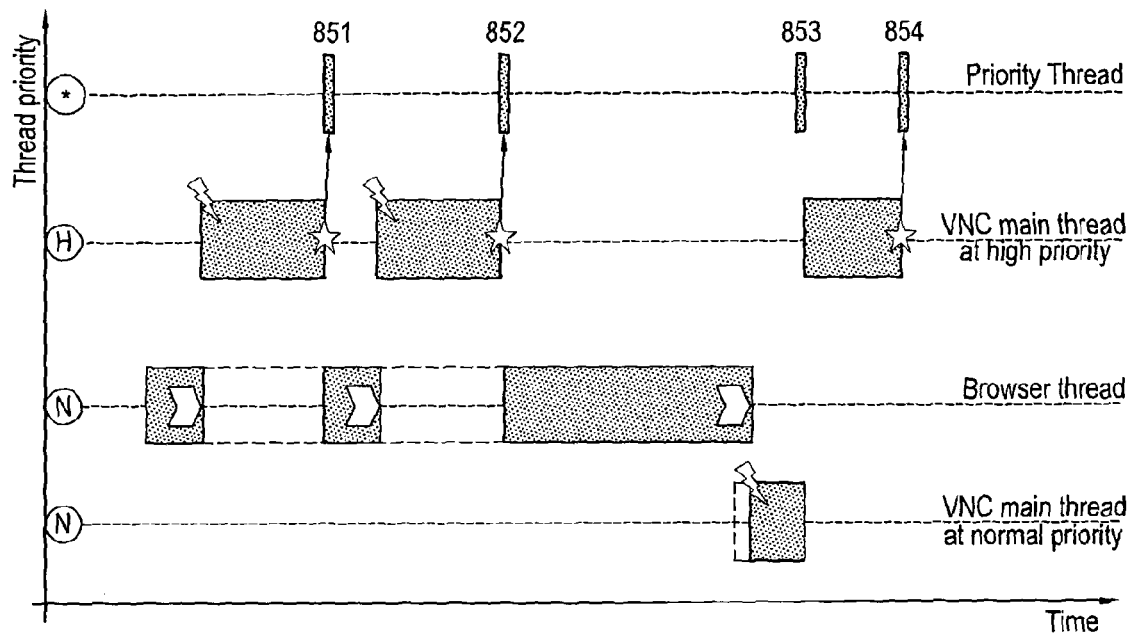

FIGS. 8a and 8b illustrate an example browser application which needs to use the CPU for a fixed period of time to decode a downloaded page. In FIG. 8a, there are three threads, namely a VNC priority thread having the highest priority, a browser thread and a VNC main thread. For clarity the browser thread and VNC main thread running at a normal priority are separated on FIG. 8a, although they are both assigned the same 'normal' priority level. The steps taken by the VNC threads are described in FIGS. 4c and 4d. As shown the browser thread has the same priority to the VNC main thread running at a normal priority. The VNC main thread also changes between low and normal priority. The browser thread is interrupted by the VNC main thread when it is operating at normal priority.

Initially the browser thread is running. The VNC main thread receives a change display notification and sends an update notification to the VNC priority thread indicating that it is about to send an update to the remote terminal, as indicated at point 801. The VNC main thread then runs so that it can capture, encode and send the update. As the VNC main thread is at the same priority as the browser the scheduler shares the CPU time between the two threads while the VNC main thread is encoding data. Once the VNC main thread has encoded and sent the updated display data as indicated by the star symbol, the browser thread runs again until the VNC main thread receives a change display notification, as illustrated by the lightning bolt. Again, the VNC main thread sends an update notification to the VNC priority thread indicating that it is about to send an update to the remote terminal, so the priority thread runs a second time as indicated at point 802. However, it has been less than 250 ms since the last update. Accordingly, the priority thread sets the low priority timer to a fixed threshold time and lowers the VNC main thread to low priority.

Whilst the VNC main thread is at low priority, the browser thread runs without interruption regardless of any display change notifications or input events received by the VNC main thread. During this time, the VNC main thread is ready to run but not running. After the time on the timer has elapsed, i.e. 350 ms after the priority of the VNC main thread was adjusted, the VNC priority threads runs again and raises the VNC main thread priority back to normal, as indicated at point 803. The VNC main thread can then finish the encoding and sending of the update that was detected at point 802. Once the update has been communicated, the browser thread runs again until it has completed its fixed period. The VNC main thread receives a change display notification. Again, the VNC main thread sends an update notification to the VNC priority thread indicating that it is about to send an update to the remote terminal, so the priority thread runs a third time before the VNC main thread runs to send the update, as indicated at point 804.

In FIG. 8b there are three threads, namely a VNC priority thread having the highest priority, a browser thread and a VNC main thread. For clarity the browser thread and VNC main thread running at a normal priority are separated on FIG. 8b, although they are both assigned the same 'normal' priority level. The steps taken by the VNC threads are described in FIGS. 4a and 4b. In contrast to the arrangement of FIG. 8a, the priority of the VNC main thread is sometimes higher than the browser thread. As explained in more detail below, it is possible for the browser thread to complete slightly sooner, while not impacting the total number of updates from the VNC main thread.

Initially, the browser thread is running. The VNC main thread receives an input, e.g. a display change notification or an input event and thus begins running, interrupting the browser thread because it is at a higher priority. When the VNC main thread has completed its processing following a display change notification it sends an update notification to the VNC priority thread, as indicated at point 851. After the VNC priority thread runs for a short period of time, the browser thread continues running until the VNC main threads receives notification of the next display change, as illustrated by the second lightning bolt. The VNC main thread thus begins running, interrupting the browser thread because it is at a higher priority.

On receipt of the second notification from the VNC main thread, at point 852, the VNC priority thread determines that less than a threshold time (e.g. 750 ms) has elapsed between the two notifications and that the VNC main thread used more than a threshold value (e.g. 50%) of the CPU between the two update notifications. Accordingly, the VNC priority thread sets the timer to a predetermined value (e.g. 350 ms) and lowers the priority of the VNC main thread to normal. The VNC main thread cannot now interrupt the browser thread until it has completed its download. At the end of the download, the VNC main thread runs again.

The next initiation of the VNC priority thread is in response to the timer elapsing, at point 853. The VNC priority thread thus raises the priority of the VNC main thread back to high. The VNC main thread thus runs as explained above.

Figure 9A:
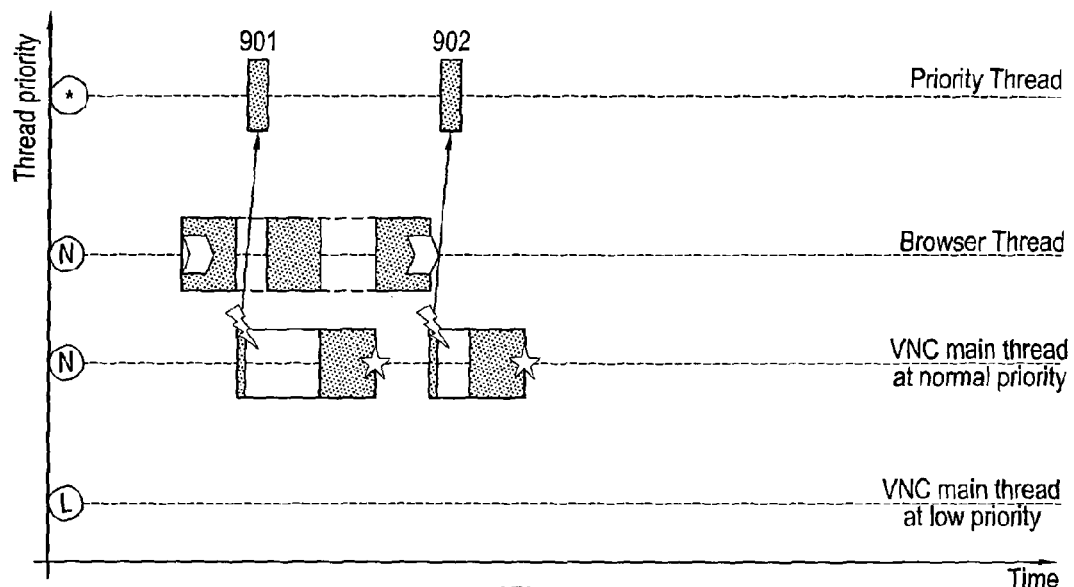
FIGS. 9a and 9b illustrate the changing priority over time for the application thread of FIG. 5d using the system of FIG. 4a or FIG. 4c respectively.
Figure 9B:
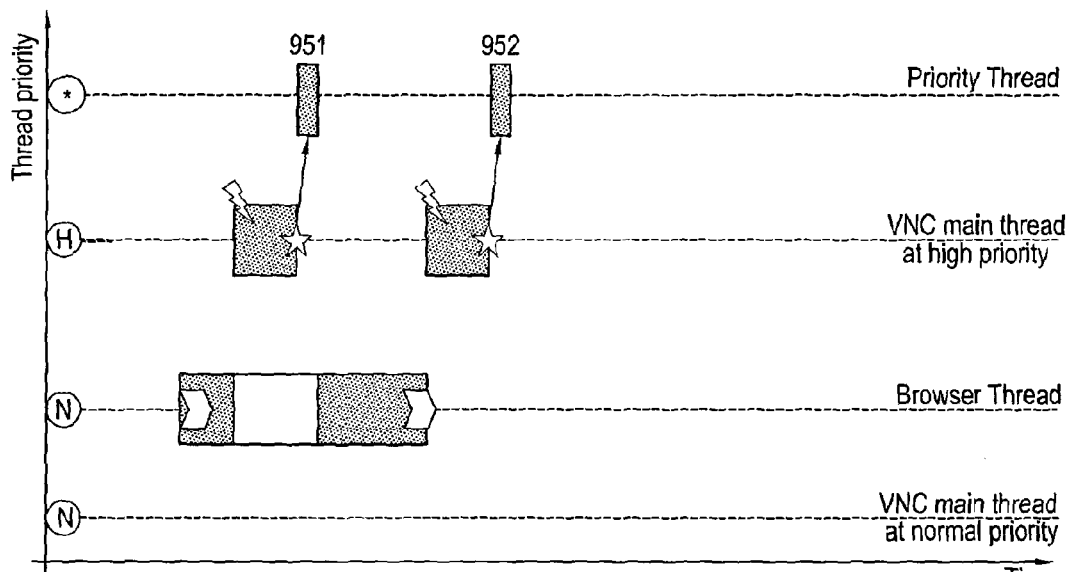

FIGS. 9a and 9b illustrate an example browser application which needs to use the CPU for a short period of time. In FIG. 9a, there are three threads, namely a VNC priority thread having the highest priority, a browser thread and a VNC main thread. For clarity the browser thread and VNC main thread are separated on FIG. 9a, although they are both assigned the same 'normal' priority level. The steps taken by the VNC threads are described in FIGS. 4c and 4d. As shown the browser thread has the same priority as the VNC main thread. In contrast to previous examples, there is no change in the priority of the VNC main thread in the time period illustrated.

Initially the browser thread is running. The VNC main thread receives a display change notification and interrupts the browser thread to send an update notification to the VNC priority thread that it is about to send an update, as indicated at point 901. However, the processing of the update does not occur immediately because of the browser thread and the VNC main thread having the same priority, therefore the scheduler is free to decide between running one or the other.

Once the VNC main thread has sent the update to the remote terminal, the VNC main thread returns to its waiting state (i.e. ready to run but not running). The browser thread is then able to complete the user interface update. Once the browser thread has finished running, the VNC threads are free to run normally. Thus the VNC main thread receives a display change notification as illustrated by the lightning bolt and sends an update notification to the priority thread at point 902. The VNC main thread is able to complete the update without interruption.

In FIG. 9*b* there are three threads, namely a VNC priority thread having the highest priority, a browser thread and a VNC main thread. The steps taken by the VNC threads are described in FIGS. 4*a* and 4*b*. In this case, the VNC main thread has a higher priority than the browser thread. Because of the short time frame, no changes to the priority of the VNC main thread are shown. In this case, the first VNC update is completed sooner than in FIG. 9*a*, therefore improving the responsiveness of the display on the remote terminal.

Initially the browser thread is running. The VNC main thread receives a display change notification and interrupts the browser thread to process the display change and then send an update notification to the VNC priority thread, as indicated at point 951. The VNC main thread then continues running, e.g. to process input events. Once these are completed, the VNC main thread returns to its waiting state and the browser thread runs again to complete its process. Once the browser thread has finished running, the VNC threads are free to run normally. Thus the VNC main thread receives a display change notification as illustrated by the lightning bolt and sends an update notification to the priority thread at point 952. The VNC main thread is able to complete the update without interruption.

In summary, when remote controlling a mobile phone, the key characteristics for the best user experience are:
1. Overall time taken—a task shouldn't take significantly longer to perform when under remote control, compared to when not under remote control. If an operation takes 10 seconds when not remote controlling the device, but takes over half a minute when the device is being remote controlled then the user experience will be negatively impacted.
2. Rate of updates on remote terminal—the representation of the mobile display on the remote terminal should update at a regular frequency. If the user is used to a device updating an animation many times a second when the device is viewed directly then a similar update rate needs to be achieved on the remote terminal.
3. Responsiveness to input events—the representation of the mobile display on the remote terminal should update in a timely manner. If the user has to wait any more than a few hundred milliseconds to see the results of any actions on the remote terminal then the user experience will be negatively impacted.

These characteristics are addressed by the embodiments described above, overcoming the problem of a finite amount of CPU resource being available to mobile devices. The embodiments improve the performance of remotely controlled devices, i.e. remote interaction is improved, in particular when heavy demands are placed on the CPU within the mobile processor. The system is also able to address the problem of maintaining a suitable display refresh rate on a remote terminal, even with CPU intensive applications running, without severely degrading the performance of applications running on the mobile device. Therefore, the embodiments described demonstrate how the invention can be applied to a mobile device to achieve the above characteristics independent of other applications being run on the mobile device.

In multi-core systems, the task scheduler (or other feature of an operating system) may control the distribution of tasks between the processors. In situations where processor resources are in demand, there may be insufficient resource available on any processor to maintain suitable refresh rates on a remote terminal without negatively impacting applications running on the mobile device. The methods described herein can address such situations in multi-core systems.

The methods described herein may further be applied to other applications, such as garbage collection in Java Virtual Machines. Typically, garbage collection runs as a background task in a Java Virtual Machine. It can be desirable to control the instances of garbage collection, such that in times of particularly resource intensive activity the priority of such a garbage collection task controlled.

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:

1. A mobile device comprising:
a processor which is configured to run at least one of a plurality of threads, said plurality of threads comprising a mobile control thread, a priority adjusting thread and at least one other thread;
a scheduler for scheduling threads to be run on said processor dependent on a priority level of a thread relative to other threads;
a display for displaying data to a user;
an input system for said user to input commands; and
a communication link for connecting said mobile device to a remote terminal;
wherein, when said mobile control thread is running, the processor is configured to
capture data currently displayed on said display;
send said captured data over said communication link; and
issue, once said captured data has been sent, an update sent notification to activate said priority adjusting thread;
wherein, when said priority adjusting thread is running, the processor is configured to
determine, on receipt of said update sent notification by said priority adjusting thread running on said processor, whether a previous update sent notification issued less than a threshold time earlier; and
if said determining step is met
reduce a priority level of said mobile control thread relative to a priority level of said at least one other thread; and
set a timer whereby when said timer expires, said priority level of said mobile control thread is increased relative to said priority level of said at least one other thread.

2. A mobile device according to claim 1, wherein said priority adjusting thread has a higher priority level than all other threads.

3. A mobile device according to claim 1, wherein said threshold time is approximately 700 ms.

4. A mobile device according to claim 1, wherein said timer is set to expire after approximately 350 ms.

5. A mobile device according to claim 1, wherein said priority adjusting thread changes said priority level of said mobile control thread between a high priority level and a normal priority level.

6. A mobile device according to claim 1, wherein said processor is further configured to:
  determine whether said mobile control thread has used more than a threshold amount of said processor; and
  if both determining steps are met
    reduce said priority level of said mobile control thread relative to said priority level of said at least one other thread; and
    set a timer whereby when said timer expires, said priority level of said mobile control thread is increased relative to said priority level of said at least one other thread.

7. A mobile device according to claim 6, wherein said threshold amount of said processor is approximately 50%.

8. A mobile device according to claim 1, wherein said capturing data step is responsive to receiving a display change notification from said display.

9. A mobile device according to claim 8, wherein when said mobile control thread is running, the processor is configured to compare said captured data with data captured previously, and wherein said sending step is conditional on detecting differences at said comparing step.

10. A system for controlling a mobile device, the system comprising:
  a mobile device comprising
    a processor which is configured to run at least one of a plurality of threads, said plurality of threads comprising a mobile control thread, a priority adjusting thread and at least one other thread;
    a scheduler for scheduling threads to be run on said processor dependent on a priority level of a thread relative to other threads;
    a display for displaying data to a user;
    an input system for said user to input commands; and
    a communication link for connecting said mobile device to a remote terminal;
    wherein, when said mobile control thread is running, the processor is configured to
      capture data currently displayed on said display;
      send said captured data over said communication link; and
      issue, once said captured data has been sent, an update sent notification to activate said priority adjusting thread;
    wherein, when said priority adjusting thread is running, the processor is configured to
      determine, on receipt of an said update sent notification by said priority adjusting thread running on said processor, whether a previous update sent notification issued less than a threshold time earlier; and
      if said determining step is met
        reduce a priority level of said mobile control thread relative to a priority level of said at least one other thread; and
        set a timer whereby when said timer expires, said priority level of said mobile control thread is increased relative to said priority level of said at least one other thread;
  a remote terminal; and
  a data link connecting said remote terminal and said mobile device;
  wherein said remote terminal comprises
    a display for displaying data to said user;
    an input system for said user to input commands; and
    a processor configured to receive said captured data from said mobile device and display said data on said remote terminal display whereby data from said mobile device display is duplicated on said remote terminal display.

11. A system according to claim 10, wherein:
  said remote terminal processor is configured to
    capture input commands; and
    send said captured input commands over said communication link to said mobile device; and
  said mobile device processor is configured to
    receive said captured input commands; and
    execute said captured input commands as if they were input on said mobile device input system.

12. A method of dynamically adjusting a priority level of a mobile control thread which transmits data between a mobile device and a remote terminal, the method comprising:
  capturing data currently displayed on a display of said mobile device;
  sending said captured data over a communication link between said mobile device and said remote terminal;
  issuing, once said captured data has been sent, a first update sent notification;
  repeating said capturing and said sending steps;
  issuing, once said captured data has been sent, a second update sent notification;
  determining, on receipt of said second update sent notification by a priority adjusting thread running on said mobile device, whether said first update sent notification issued less than a threshold time earlier than said second update sent notification; and
  if said determining step is met
    reducing a priority level of a mobile control thread which performs said capturing, sending and issuing steps from a higher level to a lower level; and
    setting a timer whereby when said timer expires, said priority level of said mobile control thread is restored to said higher level.

13. A method according to claim 12, wherein said determining, reducing and setting steps are controlled by said priority adjusting thread which has a higher priority level than all other threads.

14. A method according to claim 12, further comprising at least one of:
  said threshold time is approximately 700 ms;
  said timer is set to expire after approximately 350 ms; and
  said priority level of said mobile control thread is reduced between a high priority level and a normal priority level.

15. A method according to claim 12, further comprising:
  determining whether said mobile control thread has used more than a threshold amount of said processor; and
  if both determining steps are met
    reducing said priority level of said mobile control thread below a priority level of at least one other thread; and
    setting a timer whereby when said timer expires, said priority level of said mobile control thread is increased above said priority level of said at least one other thread.

16. A method according to claim 15, wherein said threshold amount of said processor is approximately 50%.

17. A method according to claim 12, wherein said capturing data step is responsive to receiving a display change notification from said display.

18. A method according to claim 17, further comprising comparing said captured data with data captured previously, and wherein said sending step is conditional on detecting differences at said comparing step.

19. A method for controlling a mobile device from a remote terminal comprising:
capturing data currently displayed on a display of said mobile device;
sending said captured data over a communication link between said mobile device and said remote terminal;
issuing, once said captured data has been sent, a first update sent notification;
repeating said capturing and said sending steps;
issuing, once said captured data has been sent, a second update sent notification;
determining, on receipt of said second update sent notification by a priority adjusting thread running on said mobile device, whether said first update sent notification issued less than a threshold time earlier than said second update sent notification;
if said determining step is met
reducing a priority level of a mobile control thread which performs said capturing, sending and issuing steps from a higher level to a lower level; and
setting a timer whereby when said timer expires, said priority level of said mobile control thread is restored to said higher level;
receiving said captured data from said mobile device; and
displaying said data on a remote terminal display whereby data from said mobile device display is duplicated on said remote terminal display.

20. A method according to claim 19, further comprising:
capturing input commands on said remote terminal;
sending said captured input commands over said communication link to said mobile device;
receiving said captured input commands at said mobile device; and
executing said captured input commands on said mobile device as if they were input on an input system of said mobile device.

* * * * *